United States Patent [19]

Turner et al.

[11] Patent Number: 4,640,231
[45] Date of Patent: Feb. 3, 1987

[54] ANIMAL SEPARATOR

[75] Inventors: Michael J. B. Turner, Clophill; Michael Hanley, Dunstable; Eric S. Hartwell, Bedford, all of England

[73] Assignee: National Research Development Corporation, London, England

[21] Appl. No.: 738,472

[22] Filed: May 28, 1985

[30] Foreign Application Priority Data

Jun. 1, 1984 [GB] United Kingdom ............... 8413992

[51] Int. Cl.$^4$ ............................................. A01K 29/00
[52] U.S. Cl. ............................................. 119/155
[58] Field of Search ................ 119/155, 50, 45, 55

[56] References Cited

U.S. PATENT DOCUMENTS 2,715,387 8/1955 Marmet ........................... 119/155
2,814,271 11/1957 Black ............................... 119/55
4,134,366 1/1978 Elliott ............................ 119/155

Primary Examiner—Hugh R. Chamblee
Attorney, Agent, or Firm—Cushman, Darby & Cushman

[57] ABSTRACT

An apparatus for separating animals according to their weight or other chosen characteristic comprises support means for allowing the animals to be examined one at a time, boundary means providing a barrier between a first collection region for animals selected as satisfying a particular chosen criterion and one or more second collection regions for the remaining animals, and drive means operative when necessary to move the support means and/or the boundary means to introduce or to allow the introduction of a selected animal into the appropriate collection region.

10 Claims, 12 Drawing Figures

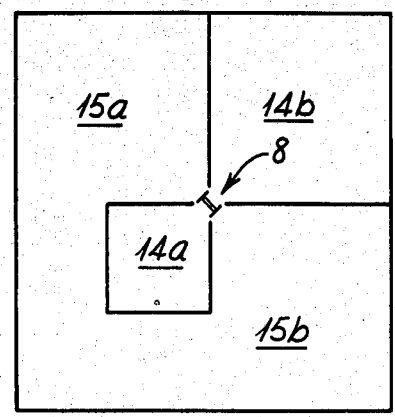
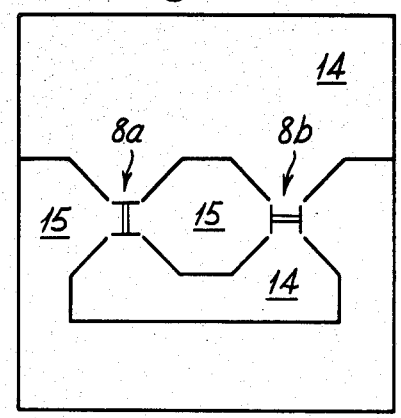
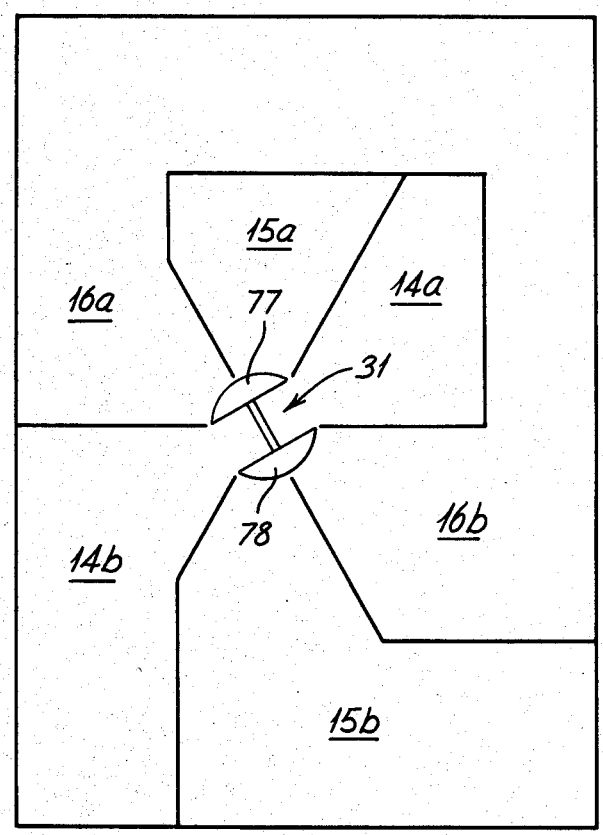

4,640,231

ANIMAL SEPARATOR

The present invention relates to an apparatus for separating animals of one characteristic from animals of another characteristic. In particular, but not exclusively, the invention relates to the separation of poultry though it might also find application in the separation of other animals such as sheep, pigs and cattle for example.

In the rearing of poultry for egg or meat production, it is sometimes desirable to divide a flock into two or more weight ranges. This is at present a tedious manual operation and it is an object of the present invention to provide an apparatus which will effect this separation automatically.

According to the broadest aspect of the present invention, an apparatus for separating animals according to their weight or other chosen characteristic comprises support means for allowing the animals to be examined one at a time, boundary means providing a barrier between a first collection region for animals selected as satisfying a particular chosen criterion and one or more second collection regions for the remaining animals, and drive means operative when necessary to move the support means and/or the boundary means to introduce or to allow the introduction of a selected animal into the appropriate collection region.

Conveniently, the support means is associated with examination means adapted automatically to actuate the drive means when it is required to move the support means and/or the boundary means as above described.

Conveniently, the apparatus may operate to introduce animals from an initial distribution region into an appropriate collection region.

Alternatively, if animals are initially present in one or more of the collection regions prior to operation of the apparatus, then the apparatus may operate to introduce into the appropriate collection region animals not already in that region.

Conveniently, when the apparatus is intended for use with poultry, then the support means includes a perch and the examination means comprising a weighing means for determining whether or not a bird on the perch satisfies a particular chosen weight criterion.

Conveniently, the drive means is operative to transfer the perch or other support means from an initial location into the appropriate collection region.

In one such case, where the support means comprises a perch, then the perch moves vertically upwards prior to transfer into the appropriate collection region thereby to encourage the bird to hold tight to the perch during the subsequent motion of the perch into that region.

As an alternative to moving the perch or other support means into the appropriate collection region, the drive means may instead be operative to move the adjacent section of the boundary means so as temporarily to extend the appropriate collection region to include the support means.

According to one optional feature of the invention, the drive means is operative to rotate the support means about a vertical axis by a predetermined amount thereby allowing the introduction of a selected animal into the appropriate collection region.

In some embodiments, the boundary means will include a flexible section past which the animal can pass into the appropriate collection region.

If desired, expulsion means may be provided for urging the animal from the support means.

In one such case, the expulsion means is operative when the support means has been introduced into the appropriate collection region to cause the animal to leave the support means for retention in that region.

In another case, however, where the apparatus is intended for use with poultry, then where the support means has not been introduced into the appropriate collection region as above described, the expulsion means is operative to propel birds from the support means past the boundary means and into the appropriate collection region, the drive means in this instance being effective to position the support means and/or the boundary means to allow this passage of the bird from one side of the boundary means to the other.

Embodiments of the invention for use as a poultry separator will now be described, by way of example only, with reference to the accompanying diagrammatic drawings in which:

FIGS. 6a and 6b are plan views of pen layouts for the birds illustrating some possible uses of the separator of FIG. 5;

FIG. 7 is a plan view of an alternative pen layout; and

Figure 1:
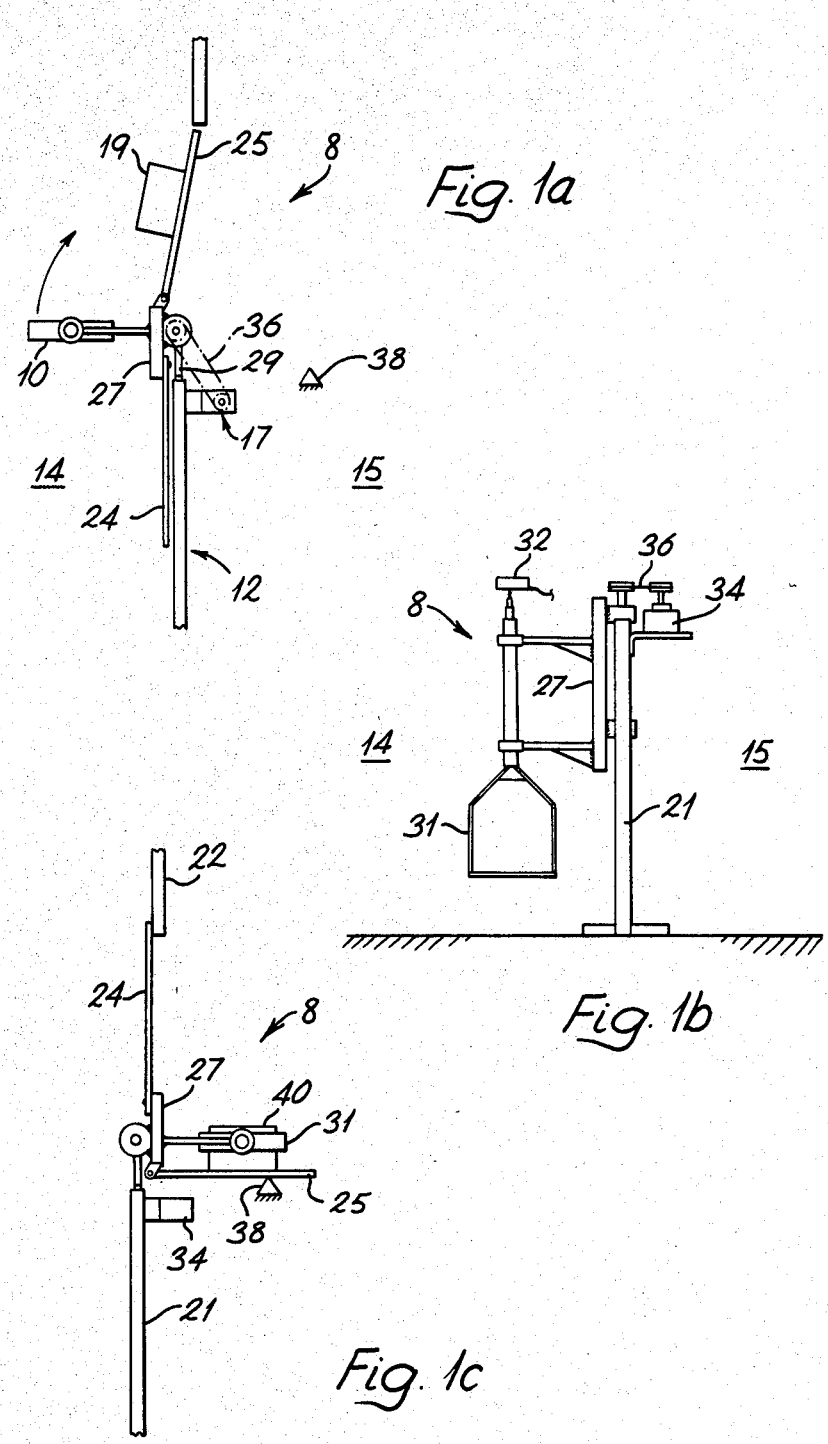
FIGS. 1a and 1b are plan and side views of a poultry separator at a first stage of its operation and FIG. 1c is a plan view of the same separator at a second stage of its operation.

Thus referring first to FIGS. 1a to 1c, a poultry separator 8 according to the present invention includes a support means 10 associated with an examination means (not shown), a boundary means 12 providing a barrier between collection regions 14, 15 and a drive means 17 for moving the support means and the boundary means from the positions shown in FIG. 1a to those shown in FIG. 1c where an expulsion means 19 encourages the bird to leave the weighing means.

In more detail, the boundary means 12 comprises pen dividers 21, 22 and vertical sheets 24, 25 for closing the gap between the two dividers.

A framework 27 pivotally attached to one side of the pen divider 21 by brackets 29 supports the perch 31 and a load cell 32 constitutes the examination means in this embodiment.

The same framework also supports the sheets 24, 25 referred to above, the sheet 24 being rigidly attached to the framework so as at all times to lie perpendicular to the width dimension of perch 31 while the sheet 25 is pivotally attached to the framework so as to be able to lie either perpendicular to or parallel to that dimension as the case may be (see FIGS. 1a and 1c respectively).

An electric motor unit 34 mounted on the opposite side of the divider 21 to brackets 29 provides the drive means 17 referred to earlier, reference numeral 36 indicating a belt and pulley connection between the motor unit 34 and the upper end of framework 27.

Conveniently, the unit 34 might take the form of a conventional windscreen wiper drive unit comprising a 12 volt D.C. motor controlled by a relay to operate the motor for a timed period. The usual internal switch in the unit will ensure that after the motor has driven through a complete cycle, it will be stopped using dynamic braking for precise positioning of its output shaft and hence of the perch 31 and sheets 24, 25.

The poultry separator 8 is completed by a stop 38 restricting the maximum movement of the sheet 25 to the position shown in FIG. 1c and by a so-called "knock-off" pad 40 secured to the perch side of sheet 25 and providing the expulsion means 19 referred to earlier.

In operation of the separator, commencing from the position shown in FIG. 1a, the load cell 32 will respond to the presence of a bird on the perch 31 of a weight not appropriate to pen region 14 by turning on the supply to motor unit 34 to provide a 180° clockwise rotation of the framework 27.

Thus whereas in the initial position of FIG. 1a, the perch 31 was located in pen region 14 with the pen divider gap closed by sheet 25, in the final position of FIG. 1c, the sheet 24 will have swung round from its position adjacent brackets 29 to close the gap vacated by sheet 25 and the perch 31, and its passenger, will find themselves in pen region 15.

The stop 38, however, will limit sheet 25 to a 90° rotation so that by the time the perch has reached its final destination, the knock-off pad 40 will have entered the space embraced by the perch so as to expel the bird from the perch 31 into the desired pen region 15.

After a preselected time interval determimed by the relay of motor unit 34, the perch 31 and vertical sheets 24, 25 will return to the positions illustrated in FIG. 1a in readiness for the next bird whose weight requires it to be in pen region 15 rather than pen region 14.

It will be understood that after a period of several days, say, virtually every bird in the flock can be expected to have occupied the perch at some time or other in the region 14. This will have the result that substantially all the birds of a weight not appropriate to pen region 14 will have been transferred by the separator to the pen region 15 as above described whereas those of a weight appropriate to pen region 14 will fail to operate the separator and will remain in that pen region.

It will be appreciated that the selection weight can be periodically altered, e.g. on a daily basis, to match changes in the mean weight of the flock.

Figure 2:
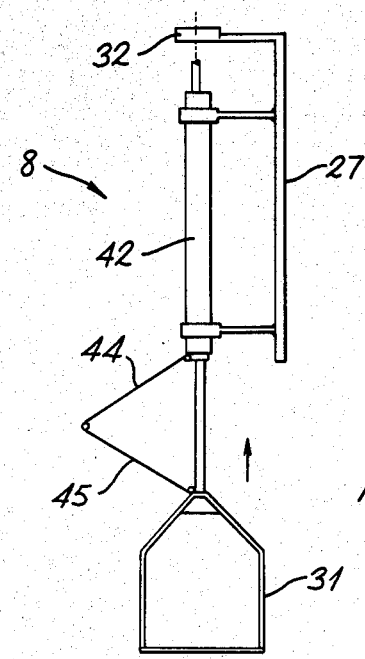
FIG. 2 is a side view of a modified form of separator operating in a similar manner to the separator of FIGURES 1a to 1c.

Turning now to FIG. 2, this shows a modification of the first embodiment in which the framework 27 supports the cylinder of a ram 42. The perch 31 is secured to the ram piston as shown and is prevented from turning about the ram axis by hinged anti-turn arms 44, 45.

The overall operation of the modified separator is substantially the same as that already described with respect to FIGS. 1a to 1c except that if the load cell indicates that transfer of the bird to pen region 15 is desirable, then as a first step it will actuate the ram 42 to lift the bird up by about 250 mm, say, before energising the motor unit 34 to move the perch into pen region 15.

The purpose of lifting the perch before turning it is twofold. First, it is found to encourage the bird to settle on the perch. Second, it allows the use of correspondingly higher barriers between the pen region 14, 15.

In a preferred version of the modified separator, additional controls are provided so that in the unusual event that the weight registered by the load cell 32 indicates the bird has left the perch during lifting, then the perch can be lowered again to save wasting an operating cycle.

Advantageously, the pneumatic (or hydraulic) circuit to the ram 42 is so arranged that although the lifting motion of the perch is relatively rapid, the lowering motion is slow to allow birds already in the pen region 15 to move out of the way.

In the event of a blockage, a limit switch (not shown) is used to sense the return of the perch to the beginning of a cycle. This ensures that the perch cannot be lowered at the wrong place thereby reducing the risk of it causing possible damage.

Figure 3A:
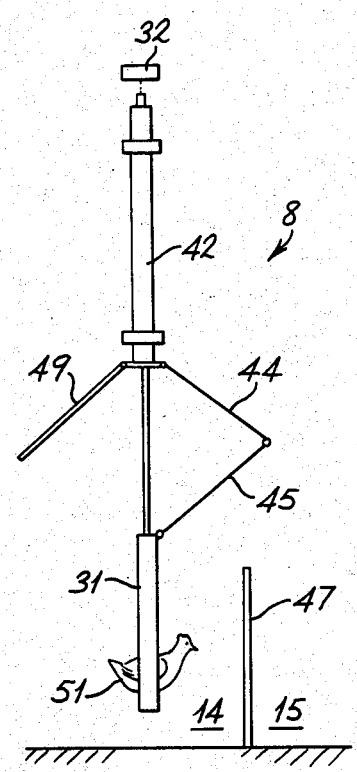
FIGS. 3a and 3b are side views of an alternative design of separator at two different stages of its operation.
Figure 3B:
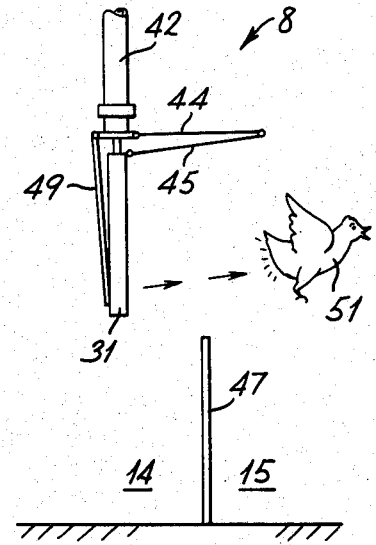

Referring now to FIGS. 3a and 3b, these show a poultry separator in which the boundary means is provided by a continuous pen divider 47 and the ram 42 of the previous embodiment is retained but with an increased stroke sufficient to raise the perch above the height of the divider as shown in FIG. 3b.

The separator is completed by an expulsion means in the form of knock-off flap 49 which operates to propel the bird (51) into pen region 15 when the perch has been raised to the position shown in FIG. 3b.

This embodiment therefore does away with the need to transfer the perch from one region to another in the manner exemplified by the first two embodiments. It should be borne in mind, however, that whereas small birds when knocked off the perch can easily fly across the small gap between perch and pen divider, as the birds get larger there is usually a need to introduce a chute down which they can slide over the top of the divider and into the new pen region 15. This chute may, for example, be formed as an integral part of the knock-off flap if desired.

The next embodiment differs from all the previously described embodiments in that movement of the perch is not required to transfer the bird from pen region 14 to pen region 15. Instead, this is done by temporarily enlarging region 15 to take in that part of region 14 containing the perch 31.

Figure 4:
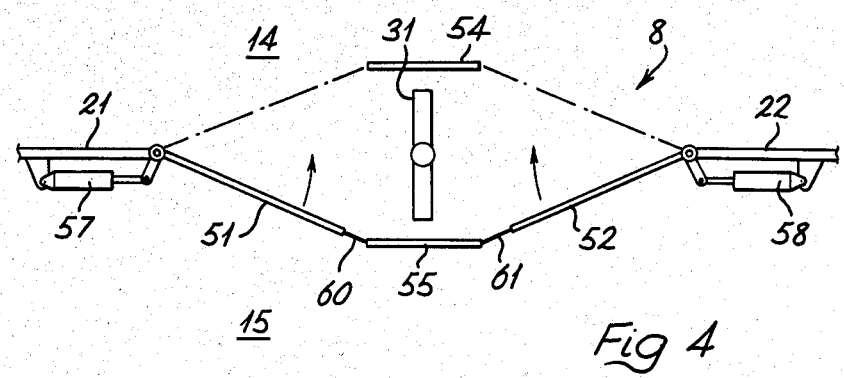
FIGS. 4 and 5 are plan views of other designs of separator.

The way in which this result is achieved is shown in FIG. 4 where the gap between the two pen dividers 21, 22 is closed by vertical sheet members 51, 52 and one or other of two fixed intermediate barriers 54, 55.

The sheet members 51, 52 are pivotally mounted at the adjacent ends of the dividers for displacement between first positions (illustrated) in which they abut with barrier 55 so as to include the perch in pen region 14 and second positions (shown in broken line) in which they abut with barrier 54 so as to include the perch in pen region 15.

The sheet members 51, 52 are moved from one position to the other by double-acting pneumatic rams 57, 58 actuated by a signal from the load cell of the weighing means whenever this indicates that a transfer of the bird in question from pen region 14 to pen region 15 (or vice versa) is desirable.

According to a preferred design feature, the rigid parts of sheet members 51, 52 stop short of the barriers 54, 55 which are engaged instead by rubber fingers or rubber flaps 60, 61 carried at the swinging edges of the sheet members as shown.

Figure 5:
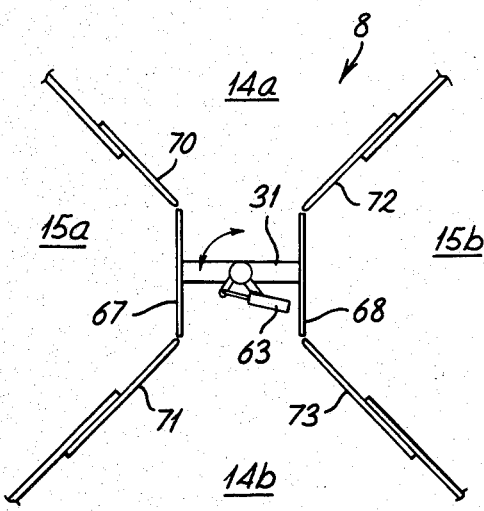

The embodiment of FIG. 5 shows yet another possibility namely that of having the perch 31 turn through 90° under the control of a double acting ram 63.

In this case, the perch is optionally set at the junction of four regions 14a, 14b, 15a, 15b. Regions 14a, 14b contain the birds to be separated. Regions 15a, 15b, which may be externally connected, receive the separated birds. Flexible side walls 67, 68 are fitted to each vertical edge of the perch and adapted to engage with flexible flap extensions 70 to 73 of the pen dividers as shown.

To introduce a bird from the initial loading region 14a, 14b into one of other of the receiving regions 15a, 15b, the perch is rapidly turned through 90° in response to a signal from the bird-weighing load cell (not shown) to the double acting ram 63.

FIGS. 6a and 6b show, by way of example only, how the separator 8 of FIG. 5 can be used with different pen lay-outs.

In FIG. 6a, for instance, the separator is used to introduce birds from initial distribution areas 14a, 14b into the L-shaped collection area 15a, 15b.

In FIG. 6b, on the other hand, the birds are initially all in areas 14 and 15 and, by way of example only, separator 8a moves heavy birds into area 14 from area 15 and separator 8b moves light birds into area 15 from area 14. It will be noted that each of the regions 14 and 15 is split up into sub-regions by having the region 14 protrude into and surround one part of region 15.

FIG. 7 shows an alternative arrangement in which the perch 31 is set at the junction of six regions 14a, 14b, 15a, 15b and 16a, 16b.

Regions 14a and 14b contain the birds to be separated. Regions 15a, 15b (which may be externally connected) are intended for separated birds above a preselected upper weight limit and regions 16a, 16b (which may also be externally connected) are intended for separated birds below a preselected lower weight limit. Baffles 77, 78 are fitted to each vertical edge of the perch as shown so as to block off two adjacent pairs of regions (15a, 16a and 15b, 16b in the situation illustrated).

To introduce a bird on the perch 31 from the initial loading region 14a and 14b into one of other of the regions 15a, 15b or 16a, 16b, the perch is rapidly turned by a double acting ram (not shown) through 60° in response to a signal from the bird-weighing load cell (not shown) in a clockwise or anticlockwise sense to bring it in front of the regions 15a, 15b or the regions 16a, 16b as the case may be. The direction of rotation in any given instance will depend on whether the bird on the perch is above or below the weight limits discussed above. Birds lying within these two limits will fail to operate the double acting ram and will therefore remain in one or other of the regions 14a, 14b on leaving the perch.

Figure 8:
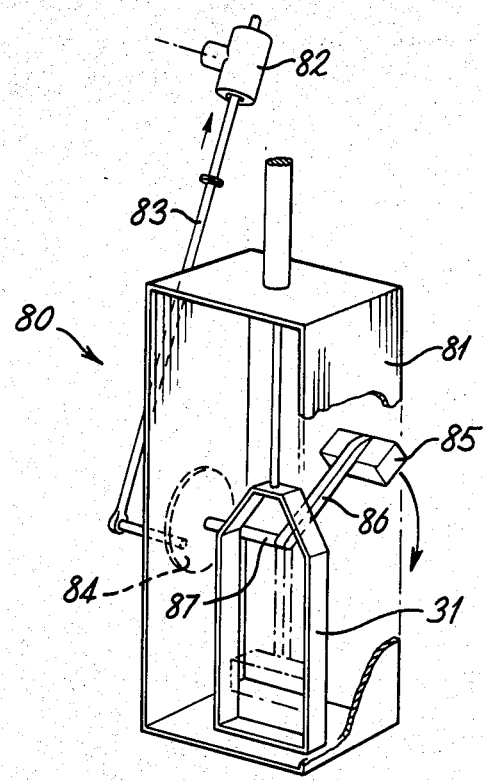
FIG. 8 is a perspective view of a knock-off unit for use in the embodiments of FIGS. 1 to 7.

Turning now to FIG. 8, this illustrates a knock-off unit 80 for use with any of the illustrated embodiments whether of the twisting-perch kind or not.

Basically, knock-off unit 80 consists of an open-sided perch-embracing housing 81, a solenoid 82, a crank arm 83 connected at one end to the solenoid plunger and at the other end to a drive wheel 84, and an expulsion pad 85. This latter is connected by a radial arm 86 to the inner end of the stub axle 87 by which the wheel 84 is rotatably mounted on a sideplate of the housing 81.

In operation, on detection of a bird requiring separation, the perch is moved to its new position as already described with reference to earlier Figures in response to a signal from the usual load cell (not shown). A suitable control unit (not shown) responds to this new position of the perch to actuate the solenoid 82 and draw up the crank arm 83, thereby to rotate the drive wheel 84. The effect of this is to move the pad 85 from an inoperative position in which it is clear of the perch to a position in which it will expel from the perch any bird present there. Following this, either after a preselected time interval set by the control unit or, alternatively, when the load cell detects that the perch is again vacant, the solenoid is released and the solenoid spring will act on the plunger to return the knock-off unit 80 to its original disposition.

A suitable control unit for the above described system might, for example comprise a microprocessor which registers the weight of any bird on the perch in response to a signal from the load cell. If the bird is one requiring separation, the microprocessor will then operate, optionally via one or more relays, to activate the perch raising or twisting mechanism, as the case may be. Once the perch is in its new position, the control unit will operate to activate the solenoid 82 as above described.

To summarise, the present invention provides an automatic system for achieving successful animal separation typically over a period of several days. Basically, in most of the poultry-separating embodiments, the device may comprise a conventional bird-weighing perch which has been modified both mechanically and electronically to provide a separating action when birds in the appropriate weight range perch on it. The selection weight is usually entered manually at the start of each separation period but it could be pre-programmed if desired.

In practice, a microprocessor control unit could be used to sample the weight of the bird on the perch and decide whether any separation action is required. Electrical, hydraulic or pneumatic actuators could be used to produce the various mechanical movements described.

As already indicated above, the apparatus of the invention is not limited to poultry separators and it is envisaged that apparatus according to the present invention could, for example, accompany or form part of the diversion devices normally fitted after sheep weighers and pig weighers or the automatic walk-through weighers currently used with cattle.

We claim:
1. An apparatus for separating animals according to their weight or other chosen characteristic comprising: support means for allowing the animals to be examined one at a time, boundary means providing a barrier between a first collection region for animals selected as satisfying a particular chosen criterion and one or more second collection regions for the remaining animals, means mounting the support means for rotation about a vertical axis, drive means connected to and operative to rotate the support means by a predetermined amount to introduce or to allow the introduction of a selected animal into the appropriate collection region, and means connected to the drive means and responsive to a characteristic of an animal on the support means for operating the drive means.

2. An apparatus as claimed in claim 1 operative to introduce animals from an initial distribution region into an appropriate collection region.

3. An apparatus as claimed in claim 1 operative when the animals are initially present in one or more of the collection regions to introduce into the appropriate collection region animals not already in that region.

4. An apparatus as claimed in claim 1 in which the boundary means includes a flexible section past which the animal can pass into the appropriate collection region.

5. An apparatus as claimed in claim 1 in which the support means is associated with examination means adapted automatically to actuate the drive means when it is required to move the support means.

6. An apparatus as claimed in claim 5 for use with poultry in which the support means includes a perch and the examination means comprises a weighing means for determining whether or not a bird on the perch satisfies a particular chosen weight criterion.

7. An apparatus as claimed in claim 1 in which the drive means is operative to transfer the support means from an initial location into the appropriate collection region.

8. An apparatus as claimed in claim 7 in which the support means comprises a perch, the mounting means allows vertical movement of the perch and the drive means moves the perch vertically upwards prior to transfer into the appropriate collection region thereby to encourage the bird to hold tight to the perch during the subsequent motion of the perch into that region.

9. An apparatus as claimed in claim 1 in which expulsion means is provided for urging the animal from the support means.

10. An apparatus as claimed in claim 9 in which the expulsion means is operative when the support means has been introduced into the appropriate collection region to cause the animal to leave the support means for retention in said collection region.

* * * * *